(12) United States Patent
Mizutani et al.

(10) Patent No.: US 6,727,310 B2
(45) Date of Patent: Apr. 27, 2004

(54) WATER-BASED METALLIC COATING COMPOSITION

(75) Inventors: Yutaka Mizutani, Nagoya (JP); Eiji Hamaoka, Nishikamo-gun (JP); Mikio Shimakawa, Aichi-gun (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/852,688

(22) Filed: May 11, 2001

(65) Prior Publication Data

US 2001/0053810 A1 Dec. 20, 2001

(30) Foreign Application Priority Data

May 11, 2000 (JP) ........................................ 2000-138299

(51) Int. Cl.⁷ .................................................. C08K 3/34
(52) U.S. Cl. ........................ 524/439; 524/442; 524/443; 524/606
(58) Field of Search ................................. 524/439, 442, 524/443, 606

(56) References Cited

U.S. PATENT DOCUMENTS 4,554,212 A * 11/1985 Diefenbach et al. ........ 428/413
5,994,530 A    11/1999 Posey-Dowty et al.
6,255,366 B1 * 7/2001 Adams et al. .............. 523/501

FOREIGN PATENT DOCUMENTS

EP    0 139 187    5/1985
EP    0 471 972    2/1992

* cited by examiner

Primary Examiner—Edward J. Cain
(74) Attorney, Agent, or Firm—Wenderoth, Lind & Ponack, LLP

(57) ABSTRACT

The present invention relates to a water-based metallic coating composition comprising a resin composition for a water-based coating composition, a metallic pigment, metal silicate and a polyamide resin and capable of forming a coating film which is excellent in a flip-flop property and which is free of metallic mottling.

13 Claims, No Drawings

WATER-BASED METALLIC COATING COMPOSITION

The present invention relates to a novel water-based metallic coating composition capable of forming a coating film which is excellent in a flip-flop property and which has no metallic mottling.

A water-based metallic coating composition prepared by mixing and dispersing a resin for a water-based metallic coating composition and a metallic pigment in water has already been known and is used as an top coating composition for an automobile outside plate. This coating composition is suited in terms of resource saving and public pollution control measure. However, there are the defects that a coating film formed has no satisfactory flip-flop property and that it is liable to bring about metallic mottling. Such defects are fatal for an top coating composition for an automobile outside plate, and a water-based metallic coating composition having no such defects is strongly desired to be developed.

An object of the present invention is to solve such defects as described above, which are involved in conventional water-based metallic coating composition, that is, to provide a water-based metallic coating composition capable of forming a coating film which is excellent in a flip-flop property and which is free of metallic mottling.

Intensive researches repeated by the present inventors have resulted in finding that the object described above can be achieved by further blending metal silicate and a polyamide resin with a water-based metallic coating composition comprising a resin composition for a water-based coating composition and a metallic pigment, and they have come to complete the present invention.

Thus, provided according to the present invention is a water-based metallic coating composition (hereinafter referred to as "present coating composition") comprising a resin composition for a water-based coating composition, a metallic pigment, metal silicate and a polyamide resin.

The present coating composition shall more specifically be explained below.

Resin Composition for a Water-based Coating Composition:

In general, the resin composition for a water-based coating composition used for the present coating composition comprises a conventionally known resin for a coating composition which can be dissolved or dispersed in water and a cross-linking agent. The above resin for a coating composition includes, for example, at least one base resin selected from an acryl resin, a vinyl resin, a polyester resin and a urethane resin each having a hydrophilic group such as a carboxyl group and a cross-linkable functional group such as a hydroxyl group together in a molecule. Suited as the above cross-linking agent is a hydrophobic or hydrophilic alkyl-etherified melamine resin which reacts with the cross-linkable functional group contained in the above base resin. In general, a proportion of the base resin to the cross-linking agent falls preferably in a range of 50 to 90% by weight, particularly 65 to 85% by weight in the case of the base resin and 50 to 10% by weight, particularly 35 to 15% by weight in the case of the cross-linking agent each based on the total amount of both components.

Metallic Pigment:

Capable of being used as the metallic pigment are flaky pigments which can provide a coating film formed from the present coating composition with a glittering brilliant feeling and a light iridescentry, and it includes, for example, flaky aluminum, deposited aluminum, aluminum oxide, bismuth oxychloride (for example, brand names "Mearlite Radiant Pearl STL", "Mearlite Radiant Pearl SUQ" and "BBT" (temporary name) manufactured by Engelhard Asia Pacific Inc.), mica, titanium oxide-coated mica, iron oxide-coated mica and micaceous iron oxide. These metallic pigments have preferably a dimension falling usually in a range of 1 to 30 $\mu$m in a longitudinal direction and a thickness falling in a range of 0.001 to 1 $\mu$m. In general, a blending proportion of the metallic pigment in the present coating composition falls suitably in a range of 0.5 to 40 parts by weight, particularly 3 to 25 parts by weight per 100 parts by weight (solid content) of the resin composition for the water-based coating composition.

Metal Silicate:

The metal silicate blended with the water-based metallic coating composition according to the present invention is suitably, for example, lithium magnesium sodium silicate $(Si_8((Mg_{5.34}Li_{0.66})O_{20}(OH)_4)Na_{0.66})$, and a commercial product thereof includes, for example, a brand name "Laponite RD" manufactured by Laport Absorbents Co., Ltd. In general, a blending proportion of the metal silicate in the present coating composition falls suitably in a range of 0.5 to 5 parts by weight, particularly 1 to 3 parts by weight per 100 parts by weight (solid content) of the resin composition for the water-based coating composition.

Polyamide Resin:

The polyamide resin blended with the water-based metallic coating composition according to the present invention is suitably a waxy substance having such a relatively low molecular weight as an average molecular weight of 500 to 5000 and includes, for example, fatty acid polyamide waxes. A commercial product corresponding thereto includes, for example, a brand name "Disparlon AQ-600" manufactured by Kusumoto Chemicals Ltd. In general, a blending proportion of the polyamide resin in the present coating composition falls suitably in a range of 0.1 to 8 parts by weight, particularly 1 to 5 parts by weight per 100 parts by weight (solid content) of the resin composition for the water-based coating composition.

Other Additives:

An acid group (for example, a carboxyl group)-containing resin such as an acryl resin and a polyester resin each having a high acid value can be blended, if necessary, with the present coating composition. The above acid group-containing resin is preferably a resin having an acid value falling in a range of usually 10 to 200 mg KOH/g, particularly 30 to 120 mg KOH/g and a number average molecular weight falling in a range of 20000 to 120000, particularly 30000 to 80000. In general, a blending proportion thereof falls suitably in a range of 0 to 5 parts by weight, particularly 0.5 to 4 parts by weight per 100 parts by weight (solid content) of the resin composition for the water-based coating composition.

A phosphoric acid-containing resin, a settling preventive, a solid color pigment and an electrostatic aid can suitably added, if necessary, to the present coating composition.

Present Coating Composition and Coating Thereof:

The present coating composition can be prepared by mixing and dispersing the respective coating composition components described above in a water-based medium (for example, deionized water) by a conventional method.

The present coating composition is preferably coated on articles to be coated such as metal-made or plastic-made outside plate parts of passenger cars, auto trucks, autobicycles and buses and metal-made or plastic-made outside plate parts of household electric products directly or after coating in advance an undercoating composition such as a cationically electrodepositable coating composition and, if necessary, an intermediate coating composition on these articles to be coated and then curing these coating films. Metallic articles to be coated are preferably subjected in advance to chemical conversion treatment with phosphates and chromates. Further, conventionally known ones can be used as the undercoating composition and the intermediate coating composition.

The present coating composition can be coated on these articles to be coated (including those coated with the undercoating composition and further coated with suitably with the intermediate coating composition) by electrostatic coating, air spraying and airless spraying. A coating film thickness thereof falls suitably in a range of usually 5 to 30 $\mu$m, particularly 10 to 20 $\mu$m as a cured coating film. The coating film can be cured by heating at about 100 to about 180° C. for about 10 to about 40 minutes.

In the coating film formed from the present coating composition, the metallic pigments are aligned evenly on a coated surface and parallel to the coated surface, and the coating film is excellent in a flip-flop (FF) property as compared with a conventional metallic coating film. In addition thereto provided is the marked effect that the metallic pigments are evenly dispersed and metallic mottling is scarcely observed.

A clear coating composition can be coated on the coating film of the present coating composition after curing it or without curing, that is, on a coated face thereof by a 2 coat 1 bake (2C1B) method or a 2 coat 2 bake (2C2B) method.

The clear coating composition is preferably a thermosetting coating composition which forms a colorless transparent or colored transparent coating film and includes, to be specific, a coating composition which contains a thermosetting resin composition and an organic solvent and which is blended, if necessary, with a solid color pigment, a metallic pigment and a UV absorber.

The thermosetting resin composition includes, for example, a composition comprising a base resin such as an acryl resin, a polyester resin, an alkyd resin, a fluororesin, a urethane resin and a silicon-containing resin each having a cross-linkable functional group such as a hydroxyl group, a carboxyl group, a silanol group and an epoxy group and a cross-linking agent such as a melamine resin, a urea resin, a (blocked) polyisocyanate compound, an epoxy compound or resin, a carboxyl group-containing compound or resin, an acid anhydride and an alkoxysilane group-containing compound or resin each capable of reacting with the above cross-linkable functional group. In general, a proportion of the base resin to the cross-linking agent falls preferably in a range of 50 to 90%, particularly 65 to 80% in the case of the base resin and 50 to 10%, particularly 35 to 20% in the case of the cross-linking agent each based on the total solid content weight of these both components.

Among these thermosetting resin compositions, preferably used is a composition capable of forming a coating film which is excellent in an acid resistance and a scratching resistance, comprising an acryl resin (base resin) having a cross-linkable functional group such as a carboxyl group, a silanol group and an epoxy group and a cross-linking agent selected from an epoxy compound or resin, a carboxyl group-containing compound or resin and an acid anhydride.

The clear coating composition can be coated by coating first the present coating composition on an article to be coated in the manner described above and then coating the clear coating composition having a solid content controlled to about 30 to about 80% by weight in coating on a coated surface thereof by electrostatic coating, air spraying and airless spraying after curing a coating film thereof by heating or as leaving it uncured. A film thickness of the clear coating composition falls suitably in a range of usually 5 to 100 $\mu$m, particularly 20 to 80 $\mu$m based on a cured coating film. The coating film can be cured by heating at about 100 to about 180° C. for about 10 to about 40 minutes.

The present invention shall be more specifically be explained below with reference to examples and comparative examples. Both parts and percentage are based on weight, and a thickness of the coating film is based on a cured coating film.

EXAMPLE 1

Mixed and dispersed in deionized water were 75 parts of a hydroxyl group-containing acryl resin (remark 1), 25 parts of a melamine resin (remark 2), 10 parts of "Alpaste 7679NS" (brand name, aluminum flake paste manufactured by Toyo Aluminum K.K.), 2 parts of "Laponite RD", 3 parts of "Disparlon AQ-600" and 2 parts of an acryl resin having a high acid value (acid value: 100 mg KOH/g, number average molecular weight: 70000), and the mixture was controlled to a viscosity 13 seconds/Ford cup #4/20° C.

(Remark 1)

hydroxyl group-containing acryl resin: copolymer obtained by copolymerizing 38 parts of methyl methacrylate, 17 parts of ethyl acrylate, 17 parts of n-butyl acrylate, 7 parts of hydroxyethyl methacrylate, 20 parts of lauryl methacrylate and one part of acrylic acid; number average molecular weight: 50000 and hydroxyl group value: 54 mg KOH/g.

(Remark 2)

melamine resin: butyl-etherified melamine resin, "U-Van 28-60" (brand name, manufactured by Mitsui Cytec Co., Ltd.).

COMPARATIVE EXAMPLE 1

Mixed and dispersed in deionized water were 75 parts of the hydroxyl group-containing acryl resin (remark 1), 25 parts of the melamine resin (remark 2), 10 parts of "Alpaste 7679NS" (brand name, aluminum flake paste manufactured by Toyo Aluminum K.K.), 3 parts of "Disparlon AQ-600" and 2 parts of the acryl resin having a high acid value (acid value: 100 mg KOH/g, number average molecular weight: 70000), and the mixture was controlled to a viscosity 13 seconds/Ford cup #4/20° C.

COMPARATIVE EXAMPLE 2

Mixed and dispersed in deionized water were 75 parts of the hydroxyl group-containing acryl resin (remark 1), 25 parts of the melamine resin (remark 2), 5 parts of "Alpaste 7679NS" (brand name, aluminum flake paste manufactured by Toyo Aluminum K.K.), 2 parts of "Laponite RD" and 2 parts of the acryl resin having a high acid value (acid value: 100 mg KOH/g, number average molecular weight: 70000), and the mixture was controlled to a viscosity 13 seconds/ Ford cup #4/20° C.

Performance Test:

The water-based metallic coating composition obtained in the examples and comparative examples described above were coated on a steel plate having a coating film formed by coating a cationically electrodepositable coating composition and an intermediate coating composition and curing them so that a film thickness thereof became 10 $\mu$m. The plate was left standing at a room temperature for 5 minutes, and then a clear coating composition (remark 3) was coated so that a film thickness thereof became 40 $\mu$m, followed by heating both coating films at 140° C. for 30 minutes to cure them at the same time. The plural layer coating film thus obtained was subjected to a performance test. The results thereof are shown in Table 1.

(Remark 3)

clear coating composition: mixed and dispersed in an aromatic hydrocarbon base solvent were 50 parts of a carboxyl group-containing acryl resin (remark 4), 50 parts of an epoxy group-containing acryl resin (remark 5), one part of "Tinuvin 900" (brand name, UV absorber manufactured by Ciba Geigy, Ltd.), 2 parts of an equimolar blending product of tetrabutylammonium bromide and monobutylphosphoric acid and 0.1 part of "BYK 300" (brand name, surface-controlling agent manufactured by BYK Chemie Co., Ltd.), and the mixture was controlled to a viscosity 20 seconds/Ford cup #4/20° C.

(Remark 4)

carboxyl group-containing acryl resin: copolymer obtained by copolymerizing 20 parts of a methanol halfesterified product of maleic anhydride, 20 parts of 4-hydroxy-n-butyl acrylate, 40 parts of n-butyl acrylate and 20 parts of styrene; number average molecular weight: 3500; hydroxyl group value: 78 mg KOH/g and acid value: 86 mg KOH/g.

(Remark 5)

epoxy group-containing acryl resin: copolymer obtained by copolymerizing 30 parts of glycidyl methacrylate, 20 parts of 4-hydroxy-n-butyl acrylate, 30 parts of n-butyl acrylate and 20 parts of styrene; number average molecular weight: 3000; epoxy group content: 2.12 millimole/g; and hydroxyl group value: 78 mg KOH/g.

The performance tests were carried out by the following methods.

Flip-flop (FF) Property:

Carried out by visual evaluation and measurement. The visual evaluation is a result obtained by visually observing the coated surface while changing the angle to investigate a change in the metallic feeling, wherein ○: change is large, and FF is good Δ: no so much change is observed, and FF is a little inferior X: change is scarcely observed, and FF is inferior The measured value is a result obtained by measuring by means of ALCOPELMR 100 (brand name, manufactured by Fuji Industry Co., Ltd.), and the larger value shows more excellent FF property.

Metallic Mottling:

This is a result obtained by visual evaluation, wherein

○: metallic mottling is scarcely observed

Δ: metallic mottling is observed a little

X: a lot of metallic mottling is observed

Whiteness on Front Face:

Among reflections of a laser irradiated at an incidence angle of 45 degree by means of ALCOPE LMR 100, measured is a signal output obtained at a light-receiving angle at which a minimum light intensity is obtained in a regular reflection area. The larger value shows stronger whiteness in a metallic feeling.

TABLE 1

|  | Example | Comparative Example | |
|---|---|---|---|
|  | 1 | 1 | 2 |
| FF property |  |  |  |
| Visual evaluation | ○ | X | Δ |
| Measured value | 1.7 | 1.2 | 1.5 |
| Metallic mottling | ○ | X | Δ |
| Whiteness on front face | 248 | 152 | 210 |

What is claimed is:

1. A water-based metallic coating composition comprising a resin composition for a water-based coating composition, a metallic pigment, metal silicate and a polyamide resin.

2. The water-based metallic coating composition as described in claim 1, wherein the resin composition for a water-based coating composition comprises a base resin having a hydrophilic group and a cross-linkable functional group together and a cross-linking agent.

3. The water-based metallic coating composition as described in claim 1, wherein the metallic pigment is a flaky pigment.

4. The water-based metallic coating composition as described in claim 1, comprising the metallic pigment in a proportion falling in a range of 0.5 to 40 parts by weight per 100 parts by weight (solid content) of the resin composition for the water-based coating composition.

5. The water-based metallic coating composition as described in claim 1, wherein the metal silicate is lithium magnesium sodium silicate.

6. The water-based metallic coating composition as described in claim 1, comprising the metal silicate in a proportion falling in a range of 0.5 to 5 parts by weight per 100 parts by weight solid content) of the resin composition for the water-based coating composition.

7. The water-based metallic coating composition as described in claim 1, wherein the polyamide resin is fatty acid polyamide wax.

8. The water-based metallic coating composition as described in claim 1, comprising the polyamide resin in a proportion falling in a range of 0.1 to 8 parts by weight per 100 parts by weight (solid content) of the resin composition for the water-based coating composition.

9. The water-based metallic coating composition as described as described in claim in claim 3, further comprising an acid group-containing resin having a high acid value.

10. The water-based metallic coating composition as described in claim 9, comprising the acid group-containing resin in a proportion falling in a range of 0 to 5 parts by weight per 100 parts by weight (solid content) of the resin composition for the water-based coating of composition.

11. A coating method comprising coating the water-based metallic coating composition as described in claim 1 and a clear coating composition en an article to be coated by a 2 coat 1 bake method or a 2 coat 2 bake method.

12. The coating method as described in claim 11, wherein the article to be coated is a car body.

13. An article coated with the water-based metallic coating composition as described in claim 1.

* * * * *